United States Patent Office 2,888,460
Patented May 26, 1959

2,888,460

PERYLENE TETRACARBOXYLIC ACID DIIMIDE DYESTUFF

Rudolf Knoche, Leverkusen, Germany, assignor to Farbenfabriken Bayer Aktiengesellschaft, Leverkusen, Germany, a corporation of Germany No Drawing. Application June 5, 1956
Serial No. 589,378

Claims priority, application Germany June 13, 1955

1 Claim. (Cl. 260—281)

This invention relates to new vat dyestuffs and to a process for their production.

It is known that vat dyestuffs can be obtained by condensation of perylene-3,4,9,10-tetracarboxylic acid or its derivatives, with ammonia or primary aliphatic or aromatic amines (German Patent 386,057). The dyestuffs thus obtained yield on cotton red to bluish red dyeings, but they have the disadvantage of possessing a relatively dull shade.

It has now been found that by condensation of perylene-3,4,9,10-tetracarboxylic acid or its derivatives with aromatic amines of the general formula

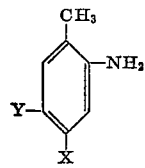

wherein X denotes chlorine or bromine and Y means hydrogen, chlorine or bromine, dyestuffs may be obtained which are very suitable for the dyeing and printing of fabrics of natural of regenerated cellulose.

The condensation of the reaction compounds can be effected in a manner similar to the process of German Patent No. 386,057, by heating the reaction components for some time to an elevated temperature, advantageously in the presence of water-splitting agents commonly used such as zinc chloride. The working up is then carried out in known manner.

The dyestuffs obtainable according to the present invention compared with the dyestuffs obtained by the process of German Patent 386,057, have a much clearer yellowish shade. They possess moreover an excellent fastness to light, chlorine and washing.

The following examples are given for the purpose of illustrating the invention, the parts being parts by weight.

Example 1

43 parts of perylene-3,4,9,10-tetracarboxylic acid anhydride and 300 parts of 4-chlorine-2-amino-1-methylbenzene are slowly heated with stirring to 140–150° C. When this temperature is attained, 4 parts of anhydrous zinc chloride are added and the temperature is then slowly raised to 200–210° C. After several hours the condensation is completed. The product is cooled to 100° C., 400 parts of ethyl alcohol are added and the mixture is filtered off with suction at 50–60° C. The residue is then washed with a little alcohol and dried. The yield is nearly quantitative.

Instead of carrying out the condensation in an excess of the one reaction component (4-chloro-2-amino-1-methylbenzene), it can also be effected in solvents such as nitrobenzene, o-dichlorobenzene, glacial acetic acid, quinoline, or also in an aqueous solution under pressure.

The dyestuff thus obtained dyes cotton or regenerated cotton from the vat in bright yellowish scarlet shades and exhibits excellent fastness properties.

The printing the dyestuff on cotton by a method common for vat dyestuff, it is expedient to convert it into a finely dispersed state, for example by dissolving it in concentrated sulfuric acid and re-precipitating in water. The dyestuff thus prepared yields when printed on cotton or regenerated cellulose very brilliant yellowish scarlet shades of excellent fastness to light, chlorine and washing.

By substituting the 43 parts of perylene-3,4,9,10-tetracarboxylic acid anhydride by 47 parts of perylene-3,4,9,10-tetracarboxylic acid the same dyestuff is obtained in a similar good yield.

Example 2

18 parts of 4,5-dichloro-2-amino-1-methylbenzene-hydrochloride are dissolved in 60 parts of quinoline with heating. When the temperature has risen to 100° C. 12.8 parts of perylene-3,4,9,10-tetracarboxylic acid anhydride and then 0.5 parts of anhydrous zinc chloride are added to the melt. It is then heated to 200–210° C. and maintained at this temperature for 8 hours until a sample in sulfuric acid shows no further increase of the blue colour. It is allowed to cool to 100° C., diluted with ethyl alcohol, filtered off with suction at 50–60° C., washed and dried. The yield is about 95 percent.

When printed on cotton, the dyestuff yields a yellowish scarlet which is very clear and has an outstanding fastness to light, chlorine and washing.

Example 3

14 parts of dichloro-perylene-tetracarboxylic acid anhydride are dissolved in 120 parts of 4-chloro-2-amino-1-methylbenzene at a temperature of 120–130° C. while stirring. Thereafter the temperature is raised slowly to 150–160° C. and 1.5 parts of zinc chloride are added. Then the temperature is raised to about 200–210° C. This temperature is kept for some hours until a sample dissolved in concentrated sulfuric acid shows no further increase of the blue color. Thereafter the mixture is cooled to 60–70° C. and the melt diluted with about 250 parts of methanol and the precipitate sucked off.

After a short washing the residue is dried. The yield is nearly quantitative.

Dyeings or prints with this dyestuff on cotton or regenerated cotton according to one of the processes usually applied for vat dyestuffs exhibit a very clear yellowish scarlet shade which is similar to the dyeing obtained with the dyestuff of Example 1.

*Example 4*

28 parts of perylene-3,4,9,10-tetracarboxylic acid anhydride are introduced into 200 parts of 4-bromo-2-amino-1-methylbenzene at a temperature of 120–130° C. while stirring. Thereafter the temperature is raised to 150–160° C. and 3 parts of dry zinc chloride are added. If the zinc chloride is dispersed the temperature is raised to about 200–205° C. and the melt is stirred at this temperature for about 6 hours. As soon as a sample dissolved in concentrated sulfuric acid shows no further increase of the greenish blue color, the melt is cooled to 80–90° C. and diluted with 400 parts of alcohol. The precipitate is sucked off, washed and dried. The dyestuff is obtained in nearly quantitative yield. Traces of unreacted perylene tetracarboxylic acid are removed when the dyestuff is boiled with a 2 percent solution of sodium hydroxide.

With the dyestuff thus obtained dyeings or prints are obtained on cotton by the known processes for vat dyestuffs of similar shade with excellent fastness properties.

I claim:

A dyestuff of the formula

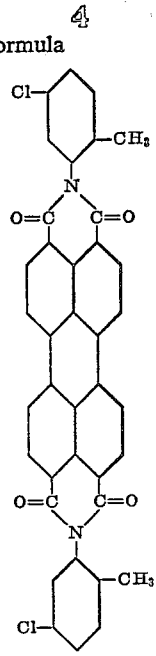

References Cited in the file of this patent

UNITED STATES PATENTS

| | | |
|---|---|---|
| 2,054,334 | Nawiasky | Sept. 15, 1936 |
| 2,543,747 | Shrader | Mar. 6, 1951 |